(12) United States Patent
Akiyama et al.

(10) Patent No.: US 9,158,044 B2
(45) Date of Patent: Oct. 13, 2015

(54) OPTICAL FILM AND DISPLAY PANEL

(75) Inventors: Kentaro Akiyama, Tokyo-to (JP); Seiji Shinohara, Tokyo-to (JP); Emi Shimano, Tokyo-to (JP); Hiroshi Nakamura, Tokyo-to (JP); Mayu Yoki, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 655 days.

(21) Appl. No.: 13/501,216

(22) PCT Filed: Oct. 13, 2010

(86) PCT No.: PCT/JP2010/067974
§ 371 (c)(1),
(2), (4) Date: Apr. 10, 2012

(87) PCT Pub. No.: WO2011/046149
PCT Pub. Date: Apr. 21, 2011

(65) Prior Publication Data
US 2012/0200933 A1    Aug. 9, 2012

(30) Foreign Application Priority Data

Oct. 16, 2009 (JP) ................. 2009-239685

(51) Int. Cl.
*G02B 5/02* (2006.01)
*G02F 1/1335* (2006.01)

(52) U.S. Cl.
CPC ............ *G02B 5/0247* (2013.01); *G02B 5/0242* (2013.01); *G02B 5/0278* (2013.01); *G02F 1/133502* (2013.01); *G02F 2201/50* (2013.01)

(58) Field of Classification Search
None
See application file for complete search history.

(56) References Cited

U.S. PATENT DOCUMENTS

| 7,542,207 | B2 * | 6/2009 | Matsunaga | 359/599 |
| 7,857,468 | B2 * | 12/2010 | Chen et al. | 359/601 |
| 8,256,908 | B2 * | 9/2012 | Inoue et al. | 359/601 |
| 8,313,201 | B2 * | 11/2012 | Wakizaka et al. | 359/601 |
| 8,322,869 | B2 * | 12/2012 | Wakizaka et al. | 359/601 |
| 2008/0123031 | A1 * | 5/2008 | Homma et al. | 349/112 |
| 2009/0202819 | A1 | 8/2009 | Asahi et al. | |
| 2009/0268299 | A1 * | 10/2009 | Furui et al. | 359/601 |
| 2010/0027126 | A1 * | 2/2010 | Chen et al. | 359/601 |
| 2010/0196687 | A1 | 8/2010 | Isono et al. | |
| 2011/0217541 | A1 | 9/2011 | Shimano et al. | |

FOREIGN PATENT DOCUMENTS

| JP | 07-159603 A | 6/1995 |
| JP | 2003-322703 A | 11/2003 |
| JP | 2004-272197 A | 9/2004 |
| JP | 2008-107792 A | 5/2008 |
| JP | 2009-108123 A | 5/2009 |
| JP | 2009-163260 A | 7/2009 |
| JP | 2009-203285 A | 9/2009 |
| JP | 2009-217258 A | 9/2009 |
| WO | 2009022639 A1 | 2/2009 |

* cited by examiner

*Primary Examiner* — Derek S Chapel
(74) *Attorney, Agent, or Firm* — Ladas & Parry LLP

(57) ABSTRACT

An optical film having an optically-transparent substrate, and a low refractive index layer having a thickness d on one side of the optically-transparent substrate, a polarizing plate and a display panel provided with the same, and a display provided with the same.

5 Claims, 4 Drawing Sheets

OPTICAL FILM AND DISPLAY PANEL

TECHNICAL FIELD

The present invention relates to an optical film to be disposed on the front face of a display (image display device) of a liquid crystal display (LCD), a cathode tube (CRT) display device, a plasma display (PDP), an organic electroluminescence (organic EL), an electronic paper, etc., a polarizer provided with the optical film, a display panel provided with the optical film or polarizer, and a display provided with the optical film, polarizer or display panel.

BACKGROUND ART

It is required for an image display surface of displays of, for example, TVs, PCs, mobile phones, GPS (global positioning system), car navigations, graphics tablets, CAD (Computer aided design system), handheld game machines, portable audios, etc. to decrease reflection from light ray irradiated by external light source such as fluorescent light, sunlight, etc., and increase its visibility. Conventionally, by providing an antireflection film on the display surface of a display utilizing the phenomenon that the reflectiveness decreases when a surface of a clear object is covered by a clear film (low refractive index layer) having low refractive index, the reflectiveness of display surface is decreased and the visibility is improved.

As one way of lowering refractive index, there is a method of containing air having a refractive index of 1 inside of a low refractive index layer. For example, in Patent Literature 1, hollow particles, the inside of which are porous or hollow, are used to decrease the refractive index of a refractive index layer.

In such a low refractive index layer containing hollow particles, the hollow particles are effective for lowering refractive index, however, there are problems that the hardness of the hollow particles is low since the inside of the hollow particles are porous or hollow, thus, the hardness and abrasion resistance of the low refractive index layer itself is low. Particularly, if the hardness or abrasion resistance is low, the surface of the low refractive index layer is easily damaged when a sharp object contacts the surface, and when the surface is damaged, the visibility of the antireflection film decreases and it leads to the deterioration of the appearance.

With respect to this problem, Patent Literature 1 suggests using solid particles, the inside of which is neither porous nor hollow, having superior hardness to hollow particles, and further modifying the surface of the hollow particles and the solid particles with crosslink-forming groups having similar structure. Thereby, Patent Literature 1 mentions that the cross-linked hollow particles and solid particles are uniformly and densely filled in a low refractive index layer, and by the crosslinking, the abrasion resistance of the low refractive index layer (anti-reflection laminate) can be improved.

However, such an anti-reflection laminate of Patent Literature 1 can have a good anti-reflective property, but has problems such as increase in cost and decrease in adhesion due to increase in the amount of solid particles to be used, since hollow particles and solid particles are uniformly and densely filled in the low refractive index layer.

In addition, an optical film (anti-reflection laminate) excellent in hardness and abrasion resistance besides having high anti-reflective property is required.

CITATION LIST

[Patent Literature 1] Japanese Patent Publication (JP-A) No. 2008-107792

SUMMARY OF INVENTION

Technical Problem

The present invention has been achieved in order to solve the above-stated problems. The present invention is to provide an optical film comprising a low refractive index layer excellent in hardness and abrasion resistance as well as adhesion besides having high anti-reflective property producible at low cost, a polarizer and display panel using the optical film, and a display using the optical film, polarizer or display panel.

Solution to Problem

As a result of diligent researches, the inventors of the present invention have found out that excellent hardness and abrasion resistance can be obtained with a small content of solid particles by the solid particles occupying a certain range of the interface on the side opposite to the substrate side (air interface side) of a low refractive index layer. Also, they have found out when hollow particles are also present at the interface as well as inside of the low refractive index layer, the refractive index of the low refractive index layer decreases, thus, an optical film having high anti-reflective property producible at low cost can be obtained. Thereby, the inventors of the present invention have reached the present invention.

Specifically, an optical film according to the present invention solving the above problems comprises an optically-transparent substrate, and a low refractive index layer having a thickness d on one side of the optically-transparent substrate, wherein the low refractive index layer comprises hollow particles having an average primary particle diameter of 10 to 100 nm, and solid particles having a dispersion average particle diameter of a value which is in the range from 1 to 20 nm and a half or less of the thickness d; and in an area of a cross-sectional surface of the low refractive index layer in a thickness direction with a width of 500 nm in a plane direction of the low refractive index layer, at least one of the hollow particles is covered with a cured resin of the low refractive index layer and allowed to contact with an interface on a side opposite to an optically-transparent substrate side of the low refractive index layer, and the solid particles occupy 50% or more of the interface excluding a part in which the hollow particles are in contact with, and are eccentrically located from the interface to a depth which is twice the dispersion average particle diameter of the solid particles in the thickness direction.

Since the hollow particles are covered with the cured resin and are present in contact with the interface, while the abrasion resistance of the low refractive index layer is ensured, the reflectance of the low refractive index layer is decreased by the air contained in the hollow particles.

In addition, since the solid particles have a dispersion average particle diameter of a value which is a half or less the thickness d, the abrasion resistance of the low refractive index layer increases. Moreover, since the solid particles occupy 50% or more of the interface excluding the part in which the hollow particles are in contact with, and are eccentrically located from the interface to the depth which is twice the dispersion average particle diameter of the solid particles, the abrasion resistance of the low refractive index layer can be efficiently improved with a small amount of solid particles to be contained.

The hollow particle(s) means a particle(s), the inside of which is surrounded by an outer shell layer, is porous or hollow, and contains air.

The solid particle(s) means a particle(s), the inside of which is neither porous nor hollow.

The dispersion average particle diameter means an average of primary particle diameters of particles in the case of non-aggregated particles, or an average of particle diameters of aggregates (average secondary particle diameter) in the case of aggregates of particles.

The average particle diameter of particles means an average of 20 particles observed in a transmission electron microscope (TEM) image of the cross-sectional surface of a cured film. The average primary particle diameter does not mean a particle diameter of an aggregate but means an average particle diameter of individual particles even in the case that observed particles are aggregated and connected. That is, both average primary particle diameter and dispersion average particle diameter of the present invention are values which can be obtained by measuring the particle diameter of the particles observed as the result of cross-sectional TEM observation.

It is preferable for the optical film according to the present invention that a ratio of the eccentrically located solid particles is from 40 to 100% with respect to the total amount of the solid particles present in the area, since the abrasion resistance of the low refractive index layer can be efficiently increased.

It is preferable for the optical film according to the present invention that a ratio of an average primary particle diameter of the hollow particles and a dispersion average particle diameter of the solid particles (average primary particle diameter/dispersion average particle diameter) is 2.0 or more, since the abrasion resistance of the interface of the low refractive index layer can be easily improved.

It is preferable for the optical film according to the present invention that a maximum height (Ry) defined by JIS B 0601-1998 of the interface of the low refractive index layer is 0.050 μm or less, since excellent abrasion resistance can be obtained.

In a suitable embodiment of the optical film according to the present invention, there may be a layer structure in which one or more kinds of layers selected from the group consisting of a hard coat layer, a high refractive index layer, an intermediate refractive index layer, an anti-static layer and an anti-glare layer are further provided between the optically-transparent substrate and the low refractive index layer.

In a suitable embodiment of the optical film according to the present invention, there may be a layer structure in which an anti-fouling layer is further provided on the interface on the side opposite to the optically-transparent substrate side of the low refractive index layer.

A polarizer according to the present invention comprises the optical film of the present invention mentioned above.

A display panel according to the present invention comprises the optical film or polarizer of the present invention mentioned above.

A display according to the present invention comprises a back-side member and the optical film, polarizer or display panel of the present invention mentioned above arranged on a viewer side of the back-side member.

Advantageous Effects of Invention

Since at least a part of the hollow particles is covered with the cured resin and present in contact with the interface on the side opposite to the optically-transparent substrate side of the low refractive index layer, while ensuring excellent abrasion resistance of the low refractive index layer, the reflectance of the low refractive index layer decreases due to the air contained in the hollow particles. In addition, the dispersion average particle diameter of the solid particles has a value which is a half or less of the thickness d, and the solid particles occupy 50% or more of the interface excluding the part in which the hollow particles are present, and are eccentrically located from the interface to the depth which is twice the dispersion average particle diameter of the solid particles, thereby, the abrasion resistance of the low refractive index layer can be efficiently improved by a small content of solid particles. By taking the above together, an optical film comprising a low refractive index layer excellent in hardness and abrasion resistance as well as adhesion besides having high anti-reflective property, and producible at low cost can be obtained.

Figure 1:
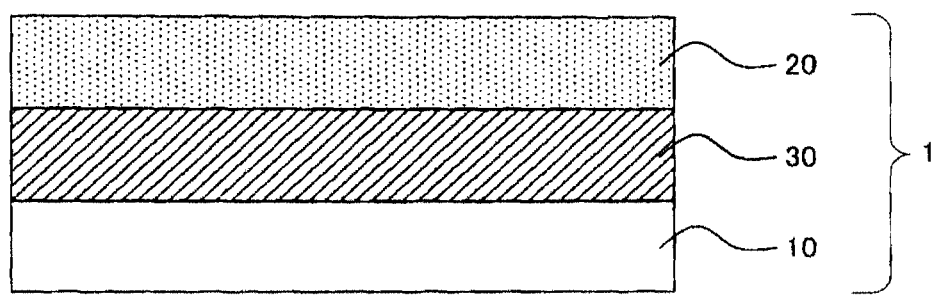
FIG. 1 is a view schematically showing an example of the layer structure of the optical film of the present invention.

REFERENCE SIGNS LIST 1, 2, 3, 4: Optical film
10: Optically-transparent substrate
20: Low refractive index layer
21: Area
30: Hard coat layer
40: Interface on the side opposite to the optically-transparent substrate side of the low refractive index layer
50: Hollow particle
60: Part in which the hollow particles are in contact with the interface
70: Solid particle
80: Depth which is twice the dispersion average particle diameter of the solid particles
90: Part of interface not occupied by the solid particle
100: Interface on the optically-transparent substrate side of the low refractive index layer
110: High refractive index layer
120: Intermediate refractive index layer
130: Anti-static layer
140: Anti-fouling layer
150: Range of interface excluding the part in which the hollow particles are in contact with, occupied by the solid particles.

DESCRIPTION OF EMBODIMENTS

Hereinafter, the optical film, polarizer, display panel and display according to the present invention will be explained.

In the present invention, (meth)acrylate means acrylate and/or methacrylate.

In the present invention, "light" includes not only electromagnetic waves having a wavelength in the visible region and those having a wavelength in the nonvisible region but also particle beams (e.g. electron beams) and ionizing radiation or radiation, which is a general term for electromagnetic waves and particle beams.

In the present invention, "hard coat layer" means a layer which has a hardness of "H" or more on the pencil hardness test with a load of 4.9 N defined in JIS K5600-5-4 (1999).

In the definition of a film and sheet in JIS-K6900, a sheet means a thin and flat product in which the thickness of the sheet is relatively thin considering the length and width thereof, and a film means a thin and flat product in which the thickness of the film is significantly thin compared with the length and width thereof and the maximum thickness is arbitrarily limited, generally provided in a form of a roll. Therefore, it can be said that a sheet having a particularly thin thickness among sheets is a film. However, the boundary between sheets and films is unclear and it is difficult to precisely distinguish the difference between sheets and films. Accordingly, in the present invention, the definition of "film" includes both one having a thick thickness and one having a thin thickness.

In the present invention, "resin" is a concept including monomers, oligomers and polymers, and moans a component which becomes a matrix of a HC layer or other functional layers after curing.

In the present invention, "molecular weight" means a polystyrene-equivalent weight average molecular weight measured by gel permeation chromatography (GPC) using a THF solvent in the case where a compound has a molecular weight distribution. In the case where a compound has no molecular weight distribution, "molecular weight" means the molecular weight of the compound itself.

In the present invention, "average particle diameter of particles" means an averaged value of diameters of 20 particles in the cross-sectional surface of a cured film observed in a transmission electron microscope (TEM) image. "Average primary particle diameter" and "dispersion average particle diameter" are based on the above definition.

Hereinafter, the optical film according to the present invention and the method of producing thereof will be explained.

(Optical Film)

The optical film according to the present invention comprises an optically-transparent substrate, and a low refractive index layer having a thickness d on one side of the optically-transparent substrate, wherein the low refractive index layer comprises hollow particles having an average primary particle diameter of 10 to 100 nm, and solid particles having a dispersion average particle diameter of a value which is in the range from 1 to 20 nm and a half or less of the thickness d; and in the area of the cross-sectional surface of the low refractive index layer in the thickness direction with a width of 500 nm in the plane direction of the low refractive index layer, at least one of the hollow particles is covered with a cured resin of the low refractive index layer and allowed to contact with an interface on the side opposite to the optically-transparent substrate side of the low refractive index layer, and the solid particles occupy 50% or more of the interface excluding a part in which the hollow particles are in contact with, and are eccentrically located from the interface to the depth which is twice the dispersion average particle diameter of the solid particles in the thickness direction.

FIG. 1 is a view schematically showing an example of a layer structure of the optical film of the present invention.

A hard coat layer 30 and the low refractive index layer 20 are provided on one side of the optically-transparent substrate 10 in this order from the optically-transparent substrate side.

Figure 2:
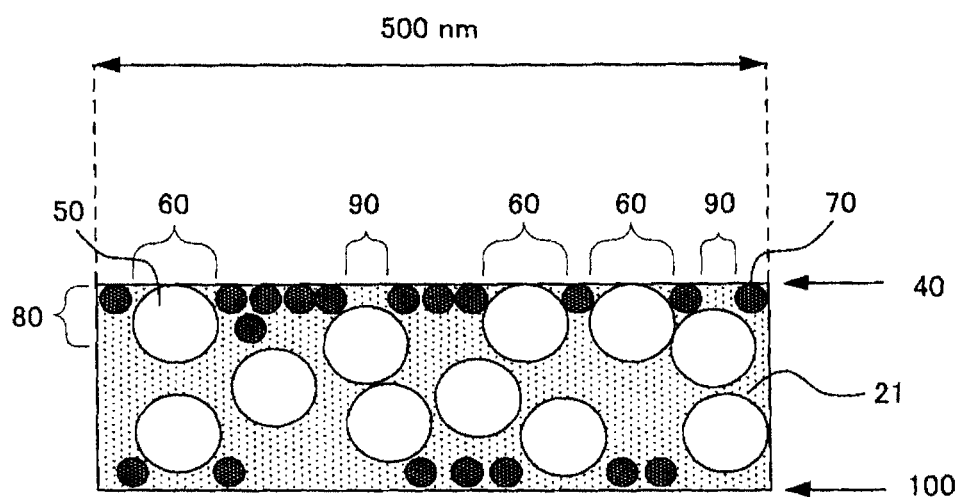
FIG. 2 is a view schematically showing an example of the particle distribution in the area of the cross-sectional surface of the low refractive index layer of the optical film of the present invention in the thickness direction with a width of 500 nm in the plane direction of the low refractive index layer.

FIG. 2 is a view schematically showing a cross-sectionally observed TEM image of an example of the particle distribution in the area of the cross-sectional surface of the low refractive index layer of the optical film of the present invention in the thickness direction with a width of 500 nm in the plane direction of the low refractive index layer.

In the area 21 of the low refractive index layer, at least one of hollow particles 50 is covered with the cured resin of the low refractive index layer and allowed to contact with the interface 40. Herein, "covered with the cured resin and allowed to contact with the interface" means the hollow particle(s) is in contact with the air interface via an extremely thin resin layer.

The solid particles 70 occupy 50% or more of the interface 40 excluding the part 60 in which the hollow particles 50 are in contact with, and are eccentrically located from the interface 40 to the depth 80 which is twice the dispersion average particle diameter of the solid particles in the thickness direction. "The part 60 in which the hollow particles 50 are in contact with" means, when the TEM cross-sectional observation is performed, a projected region of the part occupied by the hollow particles 50 in contact with the air interface excluding a projected region of the part in which the hollow particles 50 in contact with the air interface overlap the solid particles 70 in contact with the air interface, within the region having a length of 500 nm extending linearly in the width direction.

Specifically in FIG. 2, it means the interface of "500 nm-(part 60×3)". This example shows the case that particles have the same particle diameter. The particle diameter observed in the cross-sectional surface is merely a diameter of a particle observed in the cross-sectional surface at that moment, and is different from the average particle diameter.

To simplify the explanation, FIG. 2 is a schematic view altering the scale size of the layer thickness direction and the layer plane direction.

Since the hollow particles covered with the cured resin are present in contact with the interface on the side opposite to the optically-transparent substrate side of the low refractive index layer (hereinafter, if not particularly mentioned, "interface" refers to the interface on the side opposite to the optically-transparent substrate side of low refractive index layer), excellent abrasion resistance is ensured and also the reflectance of the low refractive index layer decreases due to the air contained in the hollow particles, compared to the case that the hollow particles are not covered with the cured resin and project from the interface.

Since, the part in which the solid particles are in contact with the interface accounts for 50% or more of the interface excluding the part in which the hollow particles are in contact with, and the solid particles are eccentrically located to the depth which is twice the dispersion average particle diameter of the solid particles, the abrasion resistance of the low refractive index layer can be efficiently improved by a small amount of the solid particles being contained.

The range occupied by the solid particles is not the area to the depth which is twice the dispersion average particle diameter of the solid particles (for example, depth 80 in FIG. 2), but the range in the air interface excluding the part in which the hollow particles are in contact with, occupied by the solid particles (for example, in FIG. 2, "500 nm-(part 60×3)-(part 90×2)").

That is, "the part in which the solid particles are in contact with" means, when the TEM cross-sectional observation is performed, a projected region of the part occupied by the solid particles 70 in contact with the air interface excluding a projected region of the part in which the hollow particles 50 in contact with the air interface overlap the solid particles 70 in contact with the air interface, within the region having a length of 500 nm extending linearly in the width direction.

The "part 90" means the resin part of the interface in which there is neither hollow particle nor solid particle.

At least, the solid particles occupy the above range and are eccentrically located to the depth 80 which is twice as long as the dispersion average particle diameter. Thus, as shown in FIG. 2, the solid particles may be present closer to the optically-transparent substrate-side interface 100 than the depth 80.

Similarly, at least one hollow particle is covered with the cured resin and is in contact with the interface, thus, as shown in FIG. 2, the hollow particles may be uniformly dispersed in the area 21 except the part occupied by the solid particles 70.

In the present invention, there is at least one area having such a particle distribution in the low refractive index layer.

In the optical film of the present invention, the ratio of the eccentrically located solid particles is preferably from 40 to 100% with respect to the total amount of the solid particles present in the area. If the ratio is within the above range, the abrasion resistance of the low refractive index layer can be efficiently increased with a small amount of solid particles being used. More preferably, the ratio of the eccentrically located solid particles is from 60 to 100% with respect to the total amount of the solid particles present in the area.

For example, in FIG. 2, the ratio of the eccentrically located solid particles is calculated in "12/(12+7)×100=63%", wherein there are 12 particles to the depth which is twice as long as the dispersion average particle diameter, and 7 particles in the vicinity of the interface on the optically-transparent substrate side.

In the optical film of the present invention, a maximum height (Ry) defined by JIS B 0601-1998 of the interface of the low refractive index layer is preferably 0.050 μm or less since excellent abrasion resistance can be obtained.

When the interface on the side opposite to the optically-transparent substrate side of the low refractive index layer is scratched and rubbed by steel wool, etc., the tool that scratched such as steel wool becomes lodged on thus formed convexoconcave, and the interface is easily damaged, if the maximum height (Ry) of the interface is more than 0.050 μm.

On the other hand, by setting the maximum height (Ry) to 0.050 μm or less, steel wool, etc. is less likely to be lodged so that the interface is less likely to be damaged.

The smaller maximum height (Ry) is more effective to the abrasion resistance and optical property. The maximum height (Ry) is preferably 0.050 μm or less, more preferably 0.010 μm or less. The minimum value thereof is preferably about 0.005 μm.

As described in JIS B 0601-1998, upon determining Ry, the above area is selected avoiding the part having extraordinarily high peaks and low troughs, which are regarded as damages.

Hereinafter, essential components of the optical film of the present invention, the optically-transparent substrate and the low refractive index layer, and other layers, which may be provided as needed, will be described.

(Optically-Transparent Substrate)

The optically-transparent substrate of the present invention is not particularly limited as long as it has physical properties that are required for the optically-transparent substrate of the optical laminate. The optically-transparent substrate may be accordingly selected and used from triacetyl cellulose (TAC), polyethylene terephthalate (PET) and cycloolefin polymers used for conventionally-known hard coat films or optical films.

An average light transmittance of the optically-transparent substrate in the visible light region from 380 to 780 nm is preferably 50% or more, more preferably 70% or more, still more preferably 85% or more. Light transmittance is measured by means of an ultraviolet-visible spectrophotometer (product name: UV-3100PC; manufactured by Shimadzu Corporation) and values obtained at room temperature in the air are used.

The surface treatment such as saponification treatment or providing a primer layer may be performed on the optically-transparent substrate. Additives such as anti-static agent, etc. may be added.

The thickness of the optically-transparent substrate is not particularly limited, and is generally from about 30 to about 200 μm, preferably from 40 to 200 μm.

(Low Refractive Index Layer)

The low refractive index layer is a layer comprised of a cured product of a curable resin composition for low refractive index layer (hereinafter, it may be simply referred to "the composition for low refractive index layer") at least comprising hollow particles, solid particles and a binder component. The low refractive index layer has lower refractive index than the adjacent layer on the side closer to the optically-transparent substrate of the optical film than the low refractive index layer, such as a hard coat layer and a high refractive index layer, and functions to decrease the surface reflection of the optical film by the difference of refractive index with the adjacent layer.

The refractive index of the low refractive index layer may be adjusted according to the performances required for optical films and the refractive index of the adjacent layer on the optically-transparent substrate side. For example, the refractive index of the low refractive index layer is preferably 1.45 or less.

The thickness d (nm) of the low refractive index layer may be adjusted according to the required performances, and is preferable to meet the following Formula (I):

$$d = m\lambda/(4n)$$

wherein, "n" is a refractive index of a low refractive index layer, "m" is a positive odd number, and "λ" is wavelength.

In Formula (I), "m" is preferably 1, and "λ" is preferably from 480 to 580 nm. If "λ" is within the above range, the layer thickness is preferably from 80 to 120 nm.

The distribution of the hollow particles and solid particles in the low refractive index layer is as described above, thus, the explanation is omitted here.

Hereinafter, essential components of the composition for the low refractive index layer, which forms the low refractive index layer after curing (the hollow particles, solid particles and binder component), and other components, which may be contained as needed, will be described.

(Hollow Particles)

The hollow particle(s) is a particle(s) having an outer shell layer, the inside of which surrounded by the outer shell layer is porous structure or hollow. The thickness of the outer shell layer is from 1 to 30 nm, preferably from 2 to 20 nm. The porous structure and hollow contain air having a refractive index of 1. Since the hollow particles are contained in the low refractive index layer, the refractive index of the low refractive index layer can be decreased.

The voidage of the hollow particles is from 10 to 80%. The outer shell parts of the hollow particles are observed darker black than the composition for the low refractive index layer upon TEM cross-sectional observation as in FIG. 6. The inner parts different from the black parts of the outer shell layer are the hollow parts. The average primary particle diameter in the present invention is, for example, an average of the maximum diameters of 20 parts surrounded by the outer shell layer.

As the hollow particles, hollow particles used for conventionally known anti-reflection films can be used. For example, any of inorganic hollow particles such as metal oxide, metal nitride, metal sulfide and metal fluoride, and organic particles such as hollow polymer particles disclosed in Patent Literature 1 can be used. From the view point of productivity and strength, inorganic particles are preferable. Hollow silica particles having low refractive index, from 1.20 to 1.40, are more preferable from the viewpoint of decrease in refractive index of the low refractive index layer.

The hollow particles used in the present invention have an average primary particle diameter of 10 to 100 nm in the low refractive index layer, which is the cured product of the composition for the low refractive index layer. If the average primary particle diameter of the hollow particles is below 10 nm, the solid particles described below are less likely to form the above-described distribution at the interface. If the average primary particle diameter of the hollow particles exceeds 100 nm, the size of asperity of interface increases, and the abrasion resistance decreases.

In the present invention, the average primary particle diameter of the hollow particles is from 10 to 100 nm.

It is preferable that the average primary particle diameter of the hollow particles is larger than the dispersion average particle diameter of the solid particles described below, since it is easier to form the above described distribution at the interface. Specifically, it is preferable that the average primary particle diameter of the hollow particles is from 30 to 100 nm, and the dispersion average particle diameter of the solid particles described below is from 5 to 20 nm.

The content of the hollow particles may be adjusted according to the thickness of the low refractive index layer, required abrasion resistance, etc. The content of the hollow particles is, for example, preferably from 20 to 80% by mass, more preferably from 30 to 70% by mass, with respect to the total solid content (mass) of the composition for the low refractive index layer.

(Solid Particles)

In the present invention, the solid particle(s) means a particle(s), the inside of which is neither porous nor hollow. The solid particle does not have void, therefore, the solid particle is less likely to collapse by the pressure applied from outside (external pressure) compared with the hollow particle, and is excellent in pressure resistance. Hence, the solid particles are contained in the low refractive index layer, thereby, the hardness and abrasion resistance of the low refractive index layer can be easily improved.

Figure 6:
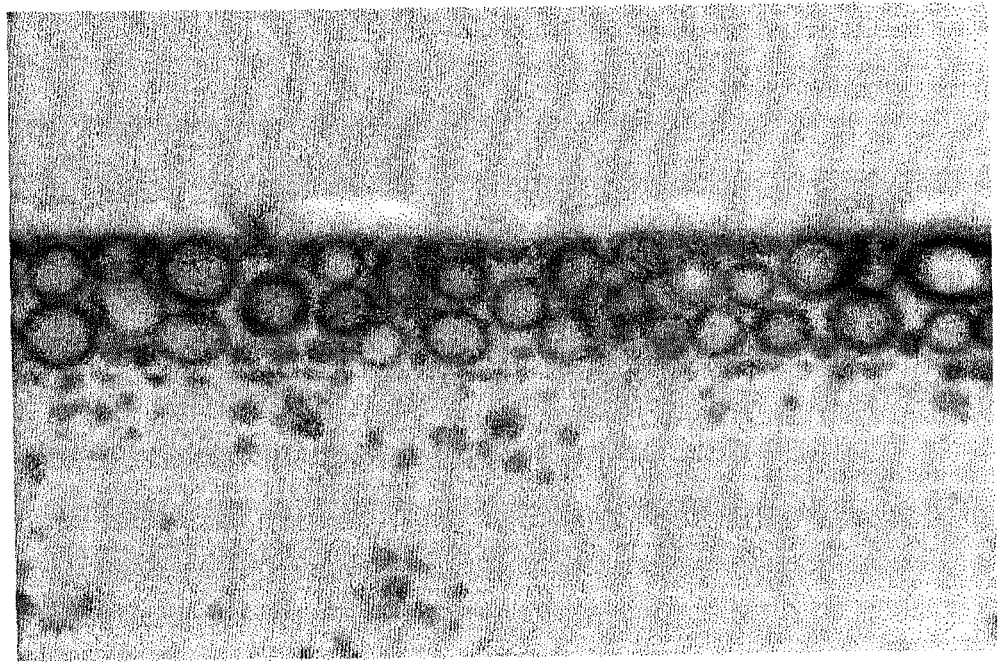
FIG. 6 is a TEM image of a cross-sectional surface of the optical film of Example 2 in a thickness direction.

The solid particle is different from the above described hollow particle, and is a particle in which no hole or hollow can be observed when cross-sectional TEM observation is performed as in FIG. 6. Since there is no hollow, the refractive index of the solid particle is higher than that of the hollow particle, from 1.42 to 1.46. The particle may be in the non-crystalline or crystalline state.

As the solid particle, any of solid particles used for conventionally-known anti-reflection films or hard coat films may be used. For example, any of inorganic solid particles such as metal oxide, metal nitride, metal sulfide and metal fluoride disclosed in Patent Literature 1 may be used.

The solid particle used in the present invention may be one having a dispersion average particle diameter of a value which is in the range from 1 to 20 nm and a half or less of the thickness d of the low refractive index layer in the low refractive index layer being a cured product of the composition for the low refractive index layer. Thus, the solid particles may be non-aggregated solid particles having a primary particle diameter of 1 to 20 nm, or aggregated solid particles, in which the particle diameter of the aggregate is from 1 to 20 nm.

If the dispersion average particle diameter of the solid particles is 1 nm or more, such solid particles can contribute to the improvement of hardness and/or abrasion resistance. If the dispersion average particle diameter of the solid particles is more than 20 nm, the above described distribution of solid particles at the interface is less likely to be formed, thus, the dispersion average particle diameter of the solid particles is preferably 20 nm or less. If the dispersion average particle diameter of the solid particles exceeds a half of the thickness of the low refractive index layer, the smoothness of the interface decreases, and the abrasion resistance of the low refractive index layer decreases.

The dispersion average particle diameter of the solid particles is preferably from 5 to 20 nm.

Examples of commercially available solid silica particle include MIBK-ST (product name; manufactured by: Nissan Chemical Industries, Ltd.; average primary particle diameter: 12 nm), MIBK-ST-ZL (product name; manufactured by: Nissan Chemical Industries, Ltd.; average primary particle diameter: 88 nm), and OSCAL series (product name; manufactured by: JGC Catalysts and Chemicals Ltd.; average primary particle diameter: 7 to 100 nm).

In the optical film of the present invention, it is preferable that the ratio of the average primary particle diameter of the hollow particles and the dispersion average particle diameter of the solid particles (average primary particle diameter/dispersion average particle diameter) is 2.0 or more, since the abrasion resistance of the interface of the low refractive index layer can be easily improved. If the ratio is within the above range, the above described distribution of the solid particles at the interface can be more easily formed. The reason thereof is presumed that the solid particles tend to go through between hollow particles more easily.

The lower limit of the ratio is preferably 2.5 or more.

The content of the solid particles may be adjusted according to the thickness of the low refractive index layer, required abrasion resistance, etc. The content of the solid particles is, for example, preferably from 1 to 30% by mass, more preferably from 5 to 20% by mass, with respect to the total solid content (mass) of the composition for the low refractive index layer. Also, it is preferable that the content of the solid particles is from 5 to 20% by mass and the content of the hollow particles is from 30 to 70% by mass with respect to the total solid content (mass) of the composition for the low refractive index layer, since the above described distribution at the interface is more easily formed.

(Surface Treatment of Particles)

The surface of the hollow particles and solid particles are preferably covered with an organic group having a photocurable group capable of cross-link formation such as a coupling agent. The photocurable group causes cross-link formation of the hollow particles and/or solid particles between the same kind of particles, between different kinds of particles, or between the particle and the binder component described below, thereby, the abrasion resistance of the low refractive index layer improves. Also, by covering the particle surface with the organic groups, aggregation between particles can be inhibited, convexoconcave on the interface is less likely to be caused by too large aggregates, and the smoothness of the interface can be ensured.

The photocurable group capable of cross-link formation is preferably ionizing radiation curable unsaturated groups. Specific examples thereof include ethylenically unsaturated bonds such as a (meth)acryloyl group, a vinyl group and an allyl group, and epoxy groups.

As the coupling agent to be used, any of conventionally-known coupling agents used for introducing a crosslink-forming group to an object may be used. Examples thereof include 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 2-(meth)acryloxypropyltrimethoxysilane, and 2-(meth)acryloxypropyltriethoxysilane.

Besides the above, covering the solid particles using any of fluorine-containing coupling agents including trifluoropropyltrimethoxysilane, heptadecafluorodecyltrimethoxysilane and 2-(perfluorohexyl)ethyltrimethoxysilane has advantages that the refractive index of the low refractive index layer can be easily decreased, and the above described distribution of the covered solid particles at the interface can be easily formed.

Any of conventionally-known methods can be used to cover hollow particles and solid particles with crosslink-forming groups. For example, the method for preparing surface-modified hollow silica microparticle A disclosed in Patent Literature 1 may be used.

In the case of solid particles, a particle comprising silica microparticles connected in a chain form, wherein the connected silica microparticles are surface treated by a silane coupling agent (reactive atypical silica microparticle), disclosed in JP-A No. 2009-108123 may also be used.

Examples of commercially available product of such a reactive solid silica particle include DP1039SIV (product name; manufactured by: JGC Catalysts and Chemicals Ltd.; average primary particle diameter: 20 nm; average connected particle number: 3.5; average secondary particle diameter: 55 nm; photocurable group: methacryloyl group).

(Binder Component)

The binder component is a component which has a photocurable group and becomes matrix of the low refractive index layer by curing upon light irradiation. The photocurable group may be any of those exemplified in the surface treatment of particles.

The binder component contained in the composition for the low refractive index layer may not be particularly limited, and any of binder components used for conventionally-known anti-reflection films or hard coat films may be used. The binder component may be used alone or in combination of two or more kinds.

Examples of the binder component include polyfunctional monomers having two or more photocurable groups in one molecule. Examples of the polyfunctional monomers include pentaerythritol tri(meth)acrylate, pentaerythritol tetra(meth)acrylate, dipentaerythritol hexa(meth)acrylate, dipentaerythritol penta(meth)acrylate, trimethylolpropane tri(meth)acrylate, trimethylolpropane hexa(meth)acrylate and polyester triacrylate, and modified products thereof.

Examples of the modified products include EO (ethylene oxide)-modified products, PO (propylene oxide)-modified products, CL (caprolactone)-modified products and isocyanuric acid-modified products.

In the above polyfunctional monomers, the photocurable group is preferably an acryloyl group rather than a methacryloyl group from the viewpoint of curing reactivity.

Examples of preferable polyfunctional monomers to be used include pentaerythritol triacrylate (PETA), dipentaerythritol hexaacrylate (DPHA), pentaerythritol tetraacrylate (PETTA), trimethylol propane triacrylate (TMPTA), dipentaerythritol pentaacrylate (DPPA), isocyanuric acid EO-modified triacrylate and polyester triacrylate.

Besides the above polyfunctional monomers, the polymers may be accordingly used. For example, polyalkylene oxide chain-containing polymer (A) disclosed in JP-A No. 2008-165040, etc. can be used. Also, monofunctional monomers may be accordingly used.

Besides the above, a fluorine-containing binder component may be suitably used to decrease the refractive index of the low refractive index layer.

Examples of the fluorine-containing binder include silicone-containing vinylidene fluoride copolymers. Specifically, the silicone-containing vinylidene fluoride copolymer can be obtained by copolymerization of a monomer composition containing vinylidene fluoride and hexafluoropropylene being raw material, and comprises 100 parts of fluorine-containing copolymer having a fluorine-containing ratio of 60 to 70% and 80 to 150 parts of polymerizable compound having an ethylenically unsaturated group.

It is preferable for the silicone-containing vinylidene fluoride copolymer that the ratio of each component in the monomer composition is vinylidene fluoride in the range of 30 to 90%, preferably from 40 to 80%, more preferably from 40 to 70%, and hexafluoropropylene in the range of 5 to 50%, preferably from 10 to 50%, more preferably from 15 to 45%. The monomer composition may further contain tetrafluoroethylene of 0 to 40%, preferably from 0 to 35%, more preferably from 10 to 30%.

The silicone-containing vinylidene fluoride copolymer may contain other copolymer components, for example, by 20% or less, preferably 10% or less. Examples thereof include polymerizable monomers having a fluorine atom such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene and α-trifluoromethacrylate.

The fluorine-containing ratio of fluorine-containing copolymer obtained from the monomer composition as described above is preferably from 62 to 70%, more preferably from 64 to 68%. By having the fluorine-containing ratio from 62 to 70% as mentioned above, the fluorine-containing polymer can have excellent solubility in a solvent. Since the composition for the low refractive index layer contains such a fluorine-containing polymer as its component, the low refractive index layer can exhibit excellent adhesion to the optically-transparent substrate, high transparency, and low refractive index, in addition, the abrasion resistance of the low refractive index layer can be increased.

The molecular weight of the fluorine-containing copolymer is preferably from 5,000 to 200,000, more preferably from 10,000 to 100,000. By having the molecular weight within the above range, the coatability of the composition for the low refractive index layer is excellent. The refractive index of the fluorine-containing copolymer itself is preferably 1.45 or less, more preferably 1.42 or less, even more preferably 1.40 or less.

The content of the binder component is preferably from 10 to 70% by mass, more preferably from 20 to 60% by mass, with respect to the total solid content (mass) of the composition for the low refractive index layer.

(Other Components of Curable Resin Composition for Low Refractive Index Layer)

In the composition for the low refractive index layer, besides the hollow particles, solid particles and binder component, if necessary, a solvent, a polymerization initiator, a leveling agent, an anti-static agent, an anti-microbial agent, etc. may be accordingly contained. Hereinafter, other components which may be contained in the composition for the low refractive index layer will be explained.

(Solvent)

In the case of using the binder component in relatively a large amount, the composition for the low refractive index layer can be prepared without solvent since the monomer and/or oligomer in the binder component can function as fluid medium. Thus, a solvent may be used accordingly for dissolving and dispersing solid content to adjust concentration so as to prepare a composition for the low refractive index layer excellent in coatability.

The solvent is not particularly limited. Any of various organic solvents including, for example, alcohols such as isopropyl alcohol, methanol and ethanol, ketones such as methyl ethyl ketone, methyl isobutyl ketone and cyclohexanone, esters such as ethyl acetate and butyl acetate, halogenated hydrocarbon, and aromatic hydrocarbon such as toluene and xylene, and a mixed solvent thereof can be used.

These solvents may be used alone or in combination of two or more kinds.

Among the solvents, it is preferable to use ketone-based organic solvents. If the composition for the low refractive index layer is prepared using a ketone-based solvent, there are advantages that it becomes easy to thinly and uniformly apply the composition on the surface of the optically-transparent substrate, and the evaporation rate of the solvent after coating is appropriate so that drying ununiformity is less likely to occur, thus, a coating layer having a uniform thickness and a large area can be easily obtained.

There is also an advantage that the ketone-based solvents have good affinity for the solid particles so that the solid particles move to the interface side along with the solvent during drying the solvent, thus, the above described distribution of the solid particles at the interface is easily formed.

The ketone-based solvent may be used alone or in combination of two or more kinds of ketone-based solvents. Also, a ketone-based solvent and a solvent other than ketones may be used in combination. In the case of using different kinds of solvents in combination, the ketone-based solvent is preferably contained by 70% by mass or more, more preferably 80% by mass or more, with respect to the total amount of solvents.

In the present invention, from the above described viewpoint that the distribution of the solid particles at the interface can be easily obtained and the smoothness of the interface increases, the solid content concentration of the composition for the low refractive index layer (ratio of the total solid content (mass) with respect to the total amount by mass of the composition) is preferably from 0.1 to 30% by mass, more preferably from 1 to 10% by mass.

Depending on the solvent being used, if the drying rate is too fast, the time for the solid particles to move becomes short, so that the above distribution is less likely to be formed. Hence, it is preferable to preliminarily adjust solvent composition, etc. accordingly.

(Polymerization Initiator)

In order to promote crosslinking reaction of the binder component, and surface-treated hollow particles and solid particles having photocurable groups, any of radical and cationic polymerization initiators may be accordingly selected for use, if necessary. These polymerization initiators are decomposed by light irradiation and/or heating to generate radicals or cations, thereby, radical polymerization and/or cationic polymerization is promoted. An example of the radical polymerization initiator includes Irgacure 184 (product name; manufactured by Ciba Japan K. K.; 1-hydroxy-cyclohexyl-phenyl-ketone).

In the case of using the polymerization initiator, the content thereof is preferably from 1 to 10% by mass with respect to the total solid content (mass) of the composition for the low refractive index layer.

(Anti-Static Agent)

As the anti-static agent, any of conventionally-known anti-static agents can be used. For example, a cationic anti-static agent such as a quaternary ammonium salt, or a fine particle such as indium tin oxide (ITO) can be used.

In the case of using the polymerization initiator, the content thereof is preferably from 1 to 30% by mass with respect to the total solid content (mass) of the composition for the low refractive index layer.

(Leveling Agent)

The composition for the low refractive index layer of the present invention may contain a conventionally-known leveling agent (anti-fouling agent) for the purpose of imparting slidability, anti-fouling properties and abrasion resistance.

As the leveling agent, any of fluorinated leveling agents and silicone leveling agents used for conventionally-known hard coat layers or anti-fouling layers can be used. The leveling agent may be a copolymer containing both fluorinated and silicone leveling agents.

Examples of commercially available products of the leveling agent include leveling agents having no ionizing radiation-curable groups such as MEGAFACE series (product name: MCF350-5; manufactured by DIC Corporation), and leveling agents having ionizing radiation-curable groups such as X22-163A and X22-164E (product names; manufactured by Shin-Etsu Chemical Co., Ltd.).

In the case of using the leveling agent, the content thereof is preferably from 0.1 to 10% by mass with respect to the total solid content (mass) of the composition for the low refractive index layer.

(Anti-Microbial Agent)

As the anti-microbial agent, any of commercially available industrial anti-microbial agents can be used. The industrial anti-microbial agents include organic anti-microbial agents and inorganic anti-microbial agents, and either one may be used.

Examples of the inorganic anti-microbial agents include NOVARON AG330, AG020, AG300 and AG1100 (product names; manufactured by Toagosei Co., Ltd.).

Examples of the organic anti-microbial agents include NK Economer ADP-51, ADP-33, AL, AL-4G, AL-8G, AL-12G, ML, ML-4G, ML-8G and ML-12G (product names; manufactured by Shin-Nakamura Chemical Co., Ltd.), and BZBEHS (X8129), BZBEHP (X8128) and ALOOGT (product names; manufactured by NICCA CHEMICAL CO., LTD.).

In the case of using the anti-microbial agent, the content thereof is preferably from 0.001 to 10% by mass with respect to the total solid content (mass) of the composition for the low refractive index layer.

(Other Layers)

In the suitable embodiment of the optical film of the present invention, the layer structure may be as such that one or more kinds of layers selected from the group consisting of a hard coat layer, a high refractive index layer, an intermediate refractive index layer, an anti-static layer and an anti-glare layer are further provided between the optically-transparent substrate and the low refractive index layer.

In another suitable embodiment of the optical film of the present invention, there may be a layer structure in which an anti-fouling layer is further provided on the interface on the side opposite to the optically-transparent substrate side of the low refractive index layer.

By having such layer structures, it is capable to impart hardness, anti-static properties, anti-glare properties and/or anti-fouling properties to the optical film of the present invention, and to improve the anti-reflective property of the optical film of the present invention.

Figure 3:
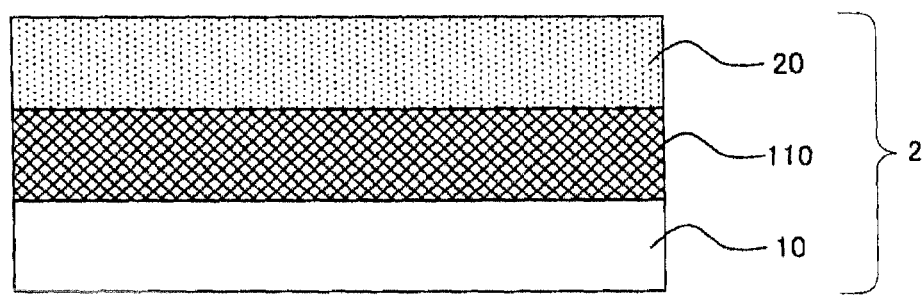
FIG. 3 is a view schematically showing another example of the layer structure of the optical film according to the present invention.

FIG. 3 is a view schematically showing another example of the layer structure of the optical film of the present invention.

The high refractive index layer 110 and the low refractive index layer 20 are provided on one side of the optically-transparent substrate 10 in this order from the optically-transparent substrate side.

Figure 4:
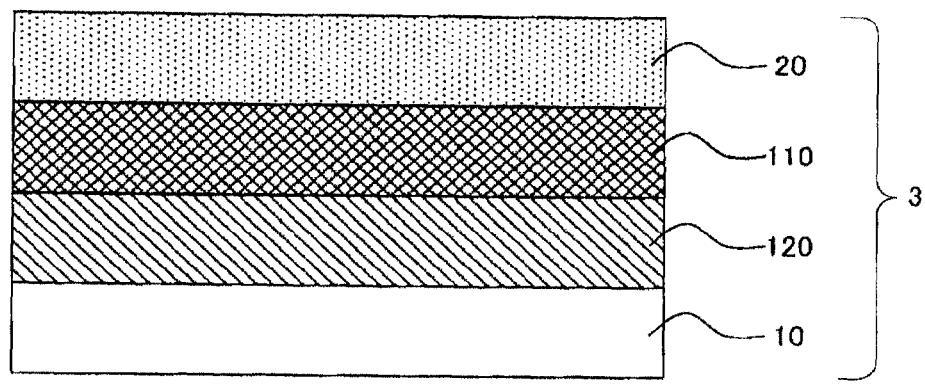
FIG. 4 is a view schematically showing another example of the layer structure of the optical film of the present invention.

FIG. 4 is a view schematically showing another example of the layer structure of the optical film of the present invention The intermediate refractive index layer 120, the high refractive index layer 110 and the low refractive index layer 20 are provided on one side of the optically-transparent substrate 10 in this order from the optically-transparent substrate side.

Figure 5:
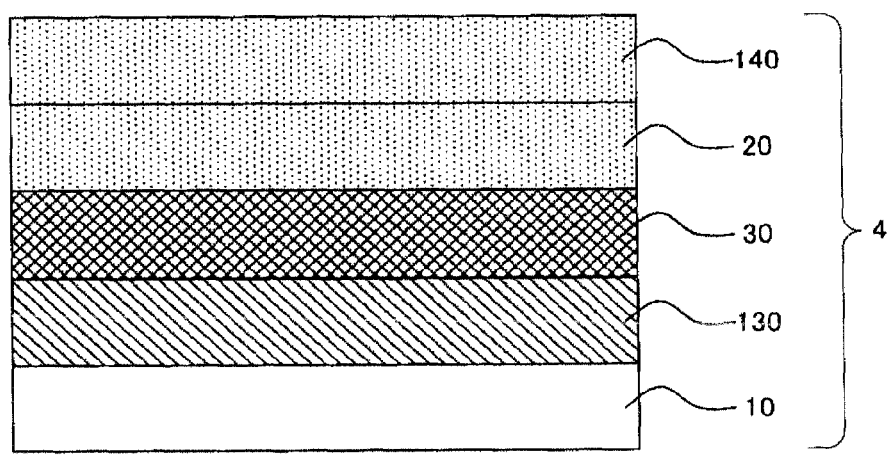
FIG. 5 is a view schematically showing another example of the layer structure of the optical film of the present invention.

FIG. 5 is a view schematically showing another example of the layer structure of the optical film of the present invention.

The anti-static layer 130, the hard coat layer 30, the low refractive index layer 20 and the anti-fouling layer 140 are provided on one side of the optically-transparent substrate 10 in this order from the optically-transparent substrate side.

Hereinafter, the hard coat layer, the high refractive index layer, the intermediate refractive index layer, the anti-static layer and the anti-fouling layer, which can be provided if desired, will be described.

(Hard Coat Layer)

"Hard coat layer" means a layer which has a hardness of "H" or more on the pencil hardness test with a load of 4.9 N defined in JIS K5600-5-4 (1999), and functions to increase the hardness of the optical film of the present invention.

As the hard coat layer, any of conventionally-known hard coat layers may be used. The hard coat layer may be comprised of a cured product of a composition containing the binder component alone, or a composition also containing the surface-modified solid silica particles with crosslink-forming groups (reactive silica microparticle), the polymerization initiator, etc. described in the composition for the low refractive index layer.

As the binder component of the hard coat layer, any of conventionally-known binder components for hard coat layer may be used. For example, the binder components exemplified in the composition for the low refractive index layer may be used.

The thickness of the hard coat layer may be appropriately adjusted if necessary, and may be from 1 to 20 μm, for example.

(High Refractive Index Layer and Intermediate refractive index layer)

The high refractive index layer and intermediate refractive index layer are layers which can be provided to adjust the reflectance of the optical film of the present invention. The high refractive index layer is a layer provided adjacent to the low refractive index layer on the optically-transparent substrate side, and the intermediate refractive index layer is a layer provide adjacent the high refractive index layer on the optically-transparent substrate side.

Generally, the high refractive index layer and the intermediate refractive index layer mainly contain a binder component and a particle for adjusting the refractive index. As the binder component, one described in the composition for the low refractive index layer can be used.

As the particles for adjusting refractive index, for example, there may be microparticles having a particle diameter of 100 nm or less. As the microparticle, there may be one or more selected from the group consisting of zinc oxide (refractive index: 1.90), titania (refractive index: 2.3-2.7), ceria (refractive index: 1.95), tin doped indium oxide (refractive index: 1.95), antimony doped tin oxide (refractive index: 1.80), yttria (refractive index: 1.87), and zirconia (refractive index: 2.0).

Specifically, the high refractive index layer preferably has a refractive index of 1.50 to 2.80.

The intermediate refractive index layer has lower refractive index than the high refractive index layer and preferably has a refractive index of 1.50 to 2.00. The layer thickness is preferably from 10 to 300 nm. According to required optical property, refractive index and layer thickness are determined.

(Anti-Static Layer)

The anti-static layer is a layer which functions to prevent the attachment of dust by inhibiting electrostatic generation, and to prevent electrostatic hazard from the outside when the optical film is incorporated into a liquid crystal display or the like.

The anti-static layer is formed of a cured product of a composition comprising an anti-static agent and a binder component. The thickness of the anti-static layer may be appropriately adjusted and is preferably from 30 nm to 3 μm.

As the performance of the anti-static layer, it is preferable that the surface resistance after forming the optical film is $10^{12} \Omega/\square$ or less. The value of surface resistance can be measured by Hiresta HT-210 (product name; manufactured by Mitsubishi Petrochemical Co., Ltd.).

As the anti-static agent, any of conventionally-known anti-static agents can be used, and one described for the composition for the low refractive index layer can be used.

The content of the anti-static agent is preferably from 1 to 30% by mass with respect to the total solid content (mass) of the composition for the anti-static layer.

As the binder component which is cured to form the anti-static layer, any of conventionally-known binder components of anti-static layers may be used, for example, one described for the composition for the low refractive index layer can be used.

(Anti-Fouling Layer)

The anti-fouling layer can be provided on the outermost surface of the optical film on the side opposite to the optically-transparent substrate for the purpose of preventing the outermost surface of the optical film from contamination. The anti-fouling layer can impart anti-fouling properties to the optical film and further increase the abrasion resistance.

The anti-fouling layer is formed of a cured product of a composition for the anti-fouling layer comprising an anti-fouling agent and a binder composition.

As the antifoulant, the leveling agent described for the composition for the low refractive index layer can be used.

The content of the antifoulant is preferably from 1 to 30% by mass with respect to the total solid content (mass) of the composition for the anti-fouling layer.

As the binder component which is cured to form the anti-fouling layer, any of conventionally-known binder components may be used, for example, one described for the composition for the low refractive index layer can be used.

The thickness of the anti-fouling layer may be accordingly adjusted if necessary, and is preferably one capable of maintaining the anti-reflection function of the low refractive index layer, for example, from 1 to 30 nm.

(Method of Producing Optical Film)

A method of producing the optical film of the present invention comprises the steps of forming a low refractive index layer by applying the composition for the low refractive index layer on one side of the optically-transparent substrate and curing the composition with light irradiation.

The composition for the low refractive index layer may be applied directly on the optically-transparent substrate, or may be applied on other layers such as the hard coat layer or anti-static layer formed on the optically-transparent substrate. In the case of providing other layers, the composition for the low refractive index layer and the composition for other layers such as the anti-static layer, etc. may be simultaneously applied.

The composition for the low refractive index layer is generally prepared by mixing and dispersing the binder component, the hollow particles and the solid particles as well as the polymerization initiator, etc. in a solvent according to a general preparation method. For mixing and dispersion, a paint shaker, beads mill or the like may be used. If the binder component is flowable, the composition for the low refractive index layer can be applied on the substrate without solvent, thus, a solvent may be accordingly used if necessary.

The coating method may be any of conventionally-known methods and not particularly limited. Examples of various methods which may be used include a spin coating method, a dipping method, a spraying method, a slide coating method, a bar coating method, a roll coater method, a meniscus coater method, a flexographic printing method, a screen printing method and a bead coater method.

For the light irradiation, in many cases, ultraviolet rays, visible light, electron beam, ionizing radiation or the like is used. In the case of ultraviolet curing, for example, ultraviolet rays emitted from a light source such as an ultra-high-pressure mercury lamp, a high-pressure mercury lamp, a low-pressure mercury lamp, a carbon arc lamp, a xenon arc lamp or a metal halide lamp can be used. The irradiance level of energy beam source is approximately from 50 to 500 mJ/cm$^2$ as the integral exposure amount of light at the ultraviolet wavelength of 365 nm.

Light irradiation is preferably performed under nitrogen atmosphere (for example, oxygen concentration of 1,000 ppm or less) from the viewpoint of preventing oxygen inhibition of the surface of the composition for the low refractive index layer.

In the case of heating in addition to light irradiation, the treatment is performed normally at a temperature in the range from 40 to 120° C.

It is preferable to dry the composition for the low refractive index layer after applying the composition and before light irradiation. As the drying method, examples thereof include drying under reduced pressure, drying by heating, and a combination thereof. For example, in the case of using methyl ethyl ketone as the solvent for the composition for the low refractive index layer, the drying step is performed at a temperature in the range from 30 to 150° C., preferably from 35° C. to 100° C., and for a time period from 20 seconds to 3 minutes, preferably from 30 seconds to 1 minute. At these temperatures, the rate of volatilization of the solvent from the coating layer and the rate of movement of the solid particles to the interface side becomes appropriate.

(Formation of Other Layer)

In the case of forming other layer on the optically-transparent substrate, other layer is formed by applying the composition of other layer before applying the composition for the low refractive index layer, and applying light and/or heat.

(Polarizer)

Next, the polarizer of the present invention will be explained. The polarizer of the present invention is a polarizer comprising a polarizing film and two or more protecting films for protecting both surfaces of the polarizing film, wherein at least one of the protecting films is the optical film of the present invention.

A preferable structure is that the optically-transparent substrate of the optical film is bond to the polarizing film via an adhesive layer comprised of polyvinyl alcohol, etc. if necessary to form a protecting film of the polarizing film, and a protecting film is provided on the other side of the polarizing film. The adhesive layer may be provided on the surface opposite to the polarizing film side of the other protecting film.

By using the optical film of the present invention as the protecting film for a polarizer, a polarizer having excellent anti-reflection function as well as abrasion resistance and adhesion can be produced, and reduction of cost, decrease in thickness of display devices, etc. are possible.

(Display Panel and Display)

The display panel of the present invention comprises the optical film of the present invention. Also, in the case of using the polarizer provided with the optical film of the present invention similarly, a display panel can be obtained.

A display comprises a display panel of viewer-side member of the display, and a back-side member including a drive. For example, in the case of a liquid crystal display, the display panel is a member comprising two glass plates having liquid crystal material locked inside (for example, a color filter substrate and an array substrate), a polarizer, and an optical film having anti-reflective property of such as the present invention or the like. The back-side member is a member comprising a light source (back light), a drive circuit for controlling LCD, a circuit for controlling the light source, chassis, etc. One example of layer structure of a liquid crystal display in this case comprises a back light part including a light guide plate, a diffusion film, etc., a polarizer, array substrate, liquid crystal layer, color filter substrate, polarizer, and optical film layered on the back light part in this order.

The display (image display device) can be constituted by arranging the optical film of the present invention, and the polarizer or the display panel described above on the viewer side of the back-side member. For example, the back-side member is arranged on the optically-transparent substrate side of the optical film.

As displays, there are LCD, PDP, ELD (organic EL, inorganic EL), CRT, SED (surface-conduction electron-emitter display), etc. differing in back-side member (differing in drive principle for image replay, etc.). Also, there are televisions, computer monitors, touch panels, electronic papers, etc. differing in the use of the display.

A representative example of the display, LCD, comprises a transmissive display and a light source device irradiating from back side of the transmissive display. In the case that the above described display is LCD, the optical film or the polarizer provide with the optical film of the present invention is arranged on the surface of the transmissive display.

Another example of the display, PDP, comprises a surface glass substrate and a back-surface glass substrate arranged to face the surface glass substrate and discharge gas is included therebetween. In the case that the display is PDP, the optical film is provided on the surface of the surface glass substrate or its front face plate (glass substrate or film substrate).

The display may be an ELD device, wherein illuminant such as zinc sulfide, diamines substance, etc. emitting light when voltage is applied is deposited on a glass substrate, and the voltage is controlled to display, or a display such as CRT, which transforms electric signal to light and generates images visible to human being. In this case, the hard coat film is provided on the outermost surface of the ELD device or CRT or on the surface of the front face plate thereof.

EXAMPLES

Hereinafter, with reference to Examples, the embodiment of the present invention will be explained in more detail, but the present invention may not be limited thereby. The average primary particle diameter of microparticles used in the ink composition before being cured (such as a dispersion liquid) refers to the particle diameter of raw material, and is different from the average particle diameter of particles in a cured film.

As hollow silica particle (1), hollow silica dispersion liquid (manufactured by: JGC Catalysts and Chemicals Ltd.; average primary particle diameter: 60 nm; isopropanol dispersion liquid (solid content: 20% by mass)) was used.

As hollow silica particle (2), hollow silica dispersion liquid (manufactured by: JGC Catalysts and Chemicals Ltd.; average primary particle diameter: 50 nm; isopropanol dispersion liquid (solid content: 20% by mass)) was used.

As solid silica particle (1), MIBK-ST (product name; manufactured by: Nissan Chemical Industries, Ltd.; average primary particle diameter: 12 nm; methyl isobutyl ketone dispersion liquid (solid content: 30% by mass)) was used.

As solid silica particle (2), OSCAL (product name; manufactured by: JGC Catalysts and Chemicals Ltd.; average primary particle diameter: 7 nm; isopropanol dispersion liquid (solid content: 20% by mass)) was used.

As solid silica particle (3), OSCAL (product name; manufactured by: JGC Catalysts and Chemicals Ltd.; average primary particle diameter: 17 nm; isopropanol dispersion liquid (solid content: 20% by mass)) was used.

As solid silica particle (4), MIBK-ST-ZL (product name; manufactured by: Nissan Chemical Industries, Ltd.; average primary particle diameter: 88 nm; methyl isobutyl ketone dispersion liquid (solid content: 30% by mass)) was used.

As solid silica particle (5), MIBK-ST-L (product name; manufactured by: Nissan Chemical Industries, Ltd.; average primary particle diameter: 44 nm; methyl isobutyl ketone dispersion liquid (solid content: 30% by mass)) was used.

As binder component (1), pentaerythritol triacrylate was used.

As binder component (2), UV1700-B (product name; manufactured by: Nippon Synthetic Chemical Industry Co., Ltd.) was used.

As a polymerization initiator, Irgacure (Irg) 184 (product name; manufactured by: Ciba Japan) was used.

As a leveling agent, a leveling agent having an ionizing radiation-curable group (product name: X-22-164E; manufactured by: Shin-Etsu Chemical Co., Ltd.) was used.

As an optically-transparent substrate, a TAC substrate (product name: TF80UL; manufactured by Fujifilm Corporation; thickness: 80 µm) was used.

Each abbreviation of compounds has the following meaning.
  PETA: pentaerythritol triacrylate
  MIRK: methyl isobutyl ketone
  MEK: methyl ethyl ketone
  IPA: isopropanol
  PGME: propylene glycol monomethyl ether
  TAC: triacetyl cellulose
  Irg184: Irgacure 184 (1-hydroxy-cyclohexyl-phenyl-ketone)

(Preparation of Surface-Treated Hollow Silica Particle (1))

The dispersion liquid of hollow silica particle (1) was subjected to solvent replacement from IPA to MIRK by means of a rotary evaporator. Thus, a dispersion liquid of 20% by mass hollow silica particle was obtained. 5% by mass of 3-methacryloxypropylmethyldimethoxysilane was added to 100% by mass of the MIRK dispersion liquid, and was subjected to heat treatment at 50° C. for 1 hour. Thus, MIRK dispersion liquid of 20% by mass surface-treated hollow silica particle (1) was obtained.

(Preparation of Surface-Treated Hollow Silica Particle (2))

Similarly as the preparation of the surface-treated hollow silica particle (1) except that hollow silica particle (1) was changed to hollow silica particle (2), the surface treatment was performed. Thus, MIBK dispersion liquid of 20% by mass surface-treated hollow silica particle (2) was obtained.

(Preparation of Surface-Treated Solid Silica Particle (1))

5% by mass of 3-methacryloxypropylmethyldimethoxysilane was added to 100% by mass of dispersion liquid of solid silica particle (1), and subjected to heat treatment at 50° C. for 1 hour. Thus, MIBK dispersion liquid of 20 wt % surface-treated solid silica particle (1) was obtained.

(Preparation of Surface-Treated Solid Silica Particle (2))

Similarly as the preparation of the surface-treated solid silica particle (1) except that solid silica particle (1) was changed to solid silica particle (2), the surface treatment was performed. Thus, MIBK dispersion liquid of 20% by mass surface-treated solid silica particle (2) was obtained.

(Preparation of surface-treated solid silica particle (3))

Similarly as the preparation of the surface-treated hollow-solid silica particle (1) except that solid silica particle (1) was changed to solid silica particle (3), the surface treatment was performed. Thus, MIBK dispersion liquid of 20% by mass surface-treated solid silica particle (3) was obtained.

(Preparation of Surface-Treated Solid Silica Particle (4))

Similarly as the preparation of the surface-treated solid silica particle (1) except that solid silica particle (1) was changed to solid silica particle (4), the surface treatment was performed. Thus, MIBK dispersion liquid of 20% by mass surface-treated solid silica particle (4) was obtained.

(Preparation of Surface-Treated Solid Silica Particle (5))

Similarly as the preparation of surface-treated solid silica particle (1) except that solid silica particle (1) was changed to solid silica particle (5), the surface treatment was performed. Thus, MIBK dispersion liquid of 20% by mass surface-treated solid silica particle (5) was obtained.

(Preparation of Curable Resin Composition for Low Refractive Index Layer)

Curable resin compositions 1 to 4 for low refractive index layer were respectively prepared by compounding the components of the composition shown below.

(Curable Resin Composition 1 for Low Refractive Index Layer)

Surface-treated hollow silica particle (1) dispersion liquid: 8.4 parts by mass (solid content: 1.7 parts by mass)
Surface-treated solid silica particle (1): 1.4 parts by mass (solid content: 0.4 parts by mass)
  PETA: 1.7 parts by mass
  Irg184: 0.1 parts by mass
  X-22-164E: 0.1 parts by mass
  MIBK: 59.5 parts by mass
  PGME: 28.8 parts by mass (Curable Resin Composition 2 for Low Refractive Index Layer)
  Surface-treated hollow silica particle (2) dispersion liquid: 10.8 parts by mass (solid content: 2.2 parts by mass)
  Surface-treated solid silica particle (1): 1.1 parts by mass (solid content: 0.3 parts by mass)
  PETA: 1.3 parts by mass
  Irg184: 0.1 parts by mass
  X-22-164E: 0.1 parts by mass
  MIBK: 57.8 parts by mass
  PGME: 28.8 parts by mass (Curable Resin Composition 3 for Low Refractive Index Layer)
  Surface-treated hollow silica particle (1) dispersion liquid: 8.4 parts by mass (solid content: 1.7 parts by mass)
  Surface-treated solid silica particle (2): 1.4 parts by mass (solid content: 0.4 parts by mass)
  PETA: 1.7 parts by mass
  Irg184: 0.1 parts by mass
  X-22-164E: 0.1 parts by mass
  MIBK: 59.5 parts by mass
  PGME: 28.8 parts by mass (Curable Resin Composition 4 for Low Refractive Index Layer)
  Surface-treated hollow silica particle (2) dispersion liquid: 10.8 parts by mass (solid content: 2.2 parts by mass)
  Surface-treated solid silica particle (3): 1.1 parts by mass (solid content: 0.3 parts by mass)
  PETA: 1.3 parts by mass
  Irg184: 0.1 parts by mass
  X-22-164E: 0.1 parts by mass
  MIBK: 57.8 parts by mass
  PGME: 28.8 parts by mass (Curable Resin Composition 5 for Low Refractive Index Layer)
  Surface-treated hollow silica particle (1) dispersion liquid: 8.4 parts by mass (solid content: 1.7 parts by mass)
  PETA: 2.1 parts by mass
  Irg184: 0.1 parts by mass
  X-22-164E: 0.1 parts by mass
  MIBK: 60.5 parts by mass
  PGME: 28.8 parts by mass (Curable Resin Composition 6 for Low Refractive Index Layer)
  Surface-treated hollow silica particle (1) dispersion liquid: 8.4 parts by mass (solid content: 1.7 parts by mass)
  Surface-treated solid silica particle (4): 1.1 parts by mass (solid content: 0.3 parts by mass)
  PETA: 1.3 parts by mass
  Irg184: 0.1 parts by mass
  X-22-164E: 0.1 parts by mass
  MIBK: 57.8 parts by mass
  PGME: 28.8 parts by mass (Curable Resin Composition 7 for Low Refractive Index Layer)
  Surface-treated hollow silica particle (1) dispersion liquid: 8.4 parts by mass (solid content: 1.7 parts by mass)
  Surface-treated solid silica particle (5): 1.4 parts by mass (solid content: 0.4 parts by mass)
  PETA: 1.7 parts by mass
  Trg184: 0.1 parts by mass
  X-22-164E: 0.1 parts by mass
  MIBK: 59.5 parts by mass
  PGME: 28.8 parts by mass (Curable Resin Composition 8 for Low Refractive Index Layer)
  Surface-treated hollow silica particle (1) dispersion liquid: 8.4 parts by mass (solid content: 1.7 parts by mass)
  Surface-treated solid silica particle (1): 1.4 parts by mass (solid content: 0.4 parts by mass)
  PETA: 1.7 parts by mass
  Irg184: 0.1 parts by mass
  X-22-164E: 0.1 parts by mass
  MIBK: 88.3 parts by mass (Curable Resin Composition 9 for Low Refractive Index Layer)
  Surface-treated hollow silica particle (1) dispersion liquid: 8.4 parts by mass (solid content: 1.7 parts by mass)
  Surface-treated solid silica particle (1): 4.2 parts by mass (solid content: 1.3 parts by mass)
  PETA: 0.8 parts by mass
  Irg184: 0.1 parts by mass
  X-22-164E: 0.1 parts by mass
  MIBK: 57.6 parts by mass
  PGME: 28.8 parts by mass (Preparation of Curable Resin Composition for Hard Coat Layer)

A curable resin composition for hard coat layer was prepared by compounding the components of the composition shown below.

(Curable Resin Composition for Hard Coat Layer)
  Surface-treated solid silica particle (1): 25 parts by mass (solid content: 0.3 parts by mass)
  UV1700-B: 25 parts by mass
  Irg184: 0.2 parts by mass
  MEK: 49.8 parts by mass (Production of Optical Film)

Example 1

The curable resin composition for hard coat layer was bar coated on one side of the TAC substrate (TF80UL), dried in a heat oven at 70° C. for 60 seconds to evaporate the solvent in the coating layer. The coating layer was irradiated with ultraviolet having the integral exposure amount of 200 mJ/cm$^2$ under nitrogen atmosphere by means of ultraviolet irradiation device (light source: H Bulb; manufactured by Fusion UV Systems Japan KK), and cured. Thus, a hard coat layer was formed.

Next, the curable resin composition 1 for low refractive index layer was bar coated on the hard coat layer, and was subjected to ultraviolet irradiation similarly as the hard coat layer to form a low refractive index layer. Thus, an optical film was obtained.

The thickness of the low refractive index layer was set so that the minimum of the reflectance measured using a spectrometer (product name: UV-3100PC; manufactured by: Shimadzu Corporation) was present around the wavelength of 550 nm.

Examples 2 to 4 and Comparative examples 1 to 5

Similarly as Example 1 except that the curable resin composition 1 for low refractive index layer was changed to the curable resin composition for low refractive index layer shown in Table 1, an optical film was obtained each for Examples 2 to 4 and Comparative examples 1 to 5.

However, in Comparative example 2, the dispersion average particle diameter of the solid silica particle exceeded a half of the thickness of the low refractive index layer.

In Comparative example 3, the ratio of average particle diameters of hollow silica and solid silica was small, thus, the abrasion resistance was inferior. In Comparative example 4, the solid silica was not eccentrically located at the vicinity of the surface, and was present in the layer uniformly, thus, the abrasion resistance was inferior. In Comparative example 5, there was an excessive amount of solid silica particles, thus, the layer was hard and brittle leading to deterioration of the adhesion.

All of the thickness of the low refractive index layer of Examples 1 to 4 and Comparative examples 1 to 5 were about 100 nm calculated from the reflectance of the part in which the minimum reflectance was measured by the spectrometer and the wavelength.

TABLE 1

|  | Composition for low refractive index layer | Particle diameter of hollow silica (nm) | Particle diameter of solid silica (nm) | Ratio of average particle diameter (hollow/solid) |
|---|---|---|---|---|
| Example 1 | 1 | 60 | 12 | 5.0 |
| Example 2 | 2 | 50 | 12 | 4.2 |
| Example 3 | 3 | 60 | 7 | 11.7 |
| Example 4 | 4 | 50 | 17 | 2.9 |
| Comparative example 1 | 5 | 60 | — | — |
| Comparative example 2 | 6 | 60 | 88 | 0.7 |
| Comparative example 3 | 7 | 60 | 44 | 1.3 |
| Comparative example 4 | 8 | 60 | 12 | 5.0 |
| Comparative example 5 | 9 | 60 | 12 | 5.0 |

(Evaluation of Optical Film)

The minimum reflectance, abrasion resistance, pencil hardness and adhesion of the optical film, and the maximum height (Ry) of interface of the optical film of Example and Comparative example were measured as below.

Cross-sectional TEM image observation of the optical film was performed, and the percentage of the interface occupied by solid particles was calculated according to the above described method.

Figure 7:
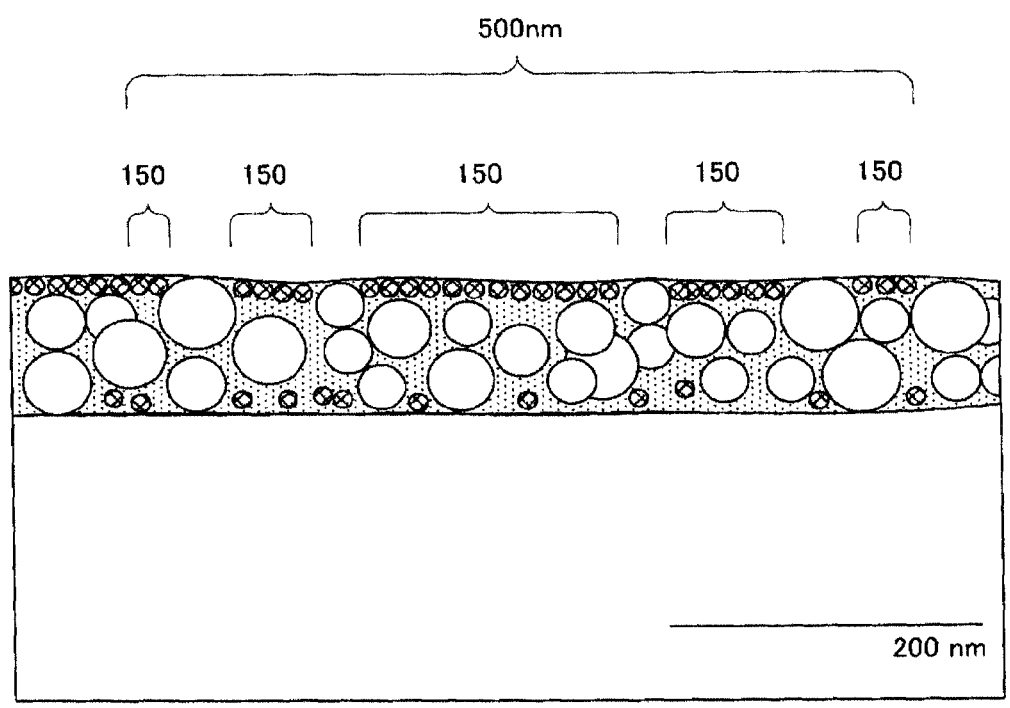
FIG. 7 is a view schematically showing the particle distribution in the low refractive index layer of the image in FIG. 6.

FIG. 6 shows a TEM image of a cross-sectional surface of the optical film obtained in Example 2 in the thickness direction, and FIG. 7 shows a view schematically showing the particle distribution in the low refractive index layer of the image of FIG. 6. In the present invention, as shown in FIG. 6, TEM image of the low refractive index layer was shot at the magnification that the whole width of 500 nm in the plane direction of the low refractive index layer was observed.

(Measurement of Reflectance)

The minimum reflectance was measured by means of a spectrometer (product name: UV-3100PC; manufactured by: Shimadzu Corporation) when both incident angle and reflection angle were 5°.

(Evaluation of Abrasion Resistance)

The surface of the optical film was rubbed 10 times in reciprocating motion by steel wool (#0000) with different loads, and presence of damage was visually observed. The criterion was as follows:

○: no damage
x: 10 or more damages observed

The loads of the abrasion resistance test used were 4.9N load and 9.8N load, and the optical film having no damage after rubbing with both loads was excellent in abrasion resistance.

(Measurement of Pencil Hardness)

Pencil hardness test defined in JIS K5600-5-4 (1999) was performed on the optical films of Examples and Comparative examples, after conditioning the humidity of the optical films for two hours under the condition of a temperature of 25° C. and a relative humidity of 60%. Therefrom, the highest hardness which caused no damage was determined.

(Measurement of Adhesion)

Cuts of 1 mm width 100 grids were made on the optical film of Examples and Comparative examples, then, stripping test was performed for five times consecutively using a industrial 24 mm tape (product name: Sellotape; manufactured by: Nichiban Co., Ltd.). The criterion for evaluation was as follows:

○: no peeling
x: peeling observed

TABLE 2

|  | Minimum reflectance (%) | Abrasion resistance 4.9N | Abrasion resistance 9.8N | Pencil hardness | Adhesion | Ry (×10$^{-3}$ μm) | Percentage of interface occupied by solid particles | Ratio of solid particles present to the depth of a value twice as much as dispersion average particle diameter |
|---|---|---|---|---|---|---|---|---|
| Example 1 | 1.1 | ○ | ○ | 4H | ○ | 9.4 | 100% | 65% |
| Example 2 | 1.1 | ○ | ○ | 4H | ○ | 8.9 | 100% | 72% |
| Example 3 | 1.1 | ○ | ○ | 4H | ○ | 9.2 | 100% | 74% |
| Example 4 | 1.2 | ○ | ○ | 4H | ○ | 9.6 | 100% | 61% |
| Comparative example 1 | 1.2 | x | x | 3H | ○ | 20.1 | 0% | — |
| Comparative example 2 | 1.4 | x | x | 3H | ○ | 54.7 | 71% | 100 |
| Comparative example 3 | 1.3 | ○ | x | 3H | ○ | 12.3 | 20% | 100 |
| Comparative example 4 | 1.1 | ○ | x | 3H | ○ | 10.1 | 44% | 37% |
| Comparative example 5 | 1.2 | ○ | x | 3H | x | 13.3 | 100% | 34% |

(Summary of Results)

As shown in Table 1, in Examples, the minimum reflectance was low and both abrasion resistance and hardness were excellent, in addition, the result of adhesion was excellent. Also, the maximum height (Ry) was low, and the percentage of the interface occupied by the solid particles was high.

From the cross-sectional image of the low refractive index layer of Example 2 in FIG. 6 and its schematic view in FIG. 7, it can be understood that 100% of the interface excluding the part in which the hollow particles are in contact with in the cross-sectional surface with a width of 500 nm in the plane direction of the low refractive index layer, is occupied by the solid particles.

However, in Comparative examples 1 to 5, the result of abrasion resistance was insufficient and the hardness was low. In Comparative example 5, the adhesion also decreased. The reasons thereof can be consider that: in Comparative example 1, solid silica is not contained; in Comparative example 2, though 50% or more of the interface is occupied by the solid particles, the dispersion average particle diameter of the solid particles was high leading to high asperity of the interface of the low refractive index layer, and decrease in smoothness of the interface; in Comparative example 3, large particle diameter of the solid particles caused decrease in percentage of the interface occupied by solid particles; in Comparative example 4, the solid silica was not eccentrically located at the vicinity of the surface and was present in the layer uniformly, thus, the percentage of the interface occupied by the solid particles decreased; and in Comparative example 5, there were excessive amount of particles, which made the film brittle.

What is claimed is:

1. An optical film comprising an optically-transparent substrate, and a low refractive index layer having a thickness d on one side of the optically-transparent substrate, wherein the low refractive index layer comprises hollow particles having a refractive index from 1.20 to 1.40 and having an average primary particle diameter of 10 to 100 nm, and solid particles having a refractive index from 1.42 to 1.46 and having a dispersion average particle diameter of a value which is in the range from 1 to 20 nm and a half or less of the thickness d, wherein a ratio of the average primary particle diameter of the hollow particles and the dispersion average particle diameter of the solid particles (average primary particle diameter/dispersion average particle diameter) is 2.0 or more; and in an area of a cross-sectional surface of the low refractive index layer in a thickness direction with a width of 500 nm in a plane direction of the low refractive index layer, at least one of the hollow particles is covered with a cured resin of the low refractive index layer and allowed to contact with an interface on a side opposite to an optically-transparent substrate side of the low refractive index layer, and the solid particles occupy 50% or more of the interface excluding a part in which the hollow particles are in contact with and are eccentrically located from the interlace to the depth which is twice the dispersion average particle diameter of the solid particles in the thickness direction, and a maximum height (Ry) defined by JIS B 0601-1998 of the interface is 0.050 μm or less.

2. The optical film according to claim 1, wherein a ratio of the eccentrically located solid particles is from 40 to 100% with respect to the total amount of the solid particles present in the area.

3. A polarizer comprising the optical film defined by claim 1.

4. A display comprising a back-side member and the polarizer defined by claim 3 arranged on a viewer side of the back-side member.

5. A display comprising a back-side member and the optical film defined by claim 1 arranged on a viewer side of the back-side member.

* * * * *